(12) United States Patent
Pathak et al.

(10) Patent No.: US 10,032,205 B2
(45) Date of Patent: Jul. 24, 2018

(54) SYSTEM, METHOD, AND NON-TRANSITORY COMPUTER-READABLE STORAGE MEDIA FOR DISPLAYING PRODUCT INFORMATION ON WEBSITES

(71) Applicant: Wal-Mart Stores, Inc., Bentonville, AR (US)

(72) Inventors: Manas A. Pathak, Sunnyvale, CA (US); Onur Gungor, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 645 days.

(21) Appl. No.: 14/671,817

(22) Filed: Mar. 27, 2015

(65) Prior Publication Data
US 2016/0284001 A1   Sep. 29, 2016

(51) Int. Cl.
*G06Q 30/00* (2012.01)
*G06Q 30/06* (2012.01)
*G06F 17/30* (2006.01)

(52) U.S. Cl.
CPC ... *G06Q 30/0627* (2013.01); *G06F 17/30525* (2013.01); *G06F 17/30867* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | |
|---|---|---|
| 7,127,416 B1 | 10/2006 | Tenorio |
| 2003/0195877 A1 | 10/2003 | Ford |
| 2009/0187557 A1 | 7/2009 | Hansen et al. |
| 2009/0204608 A1 | 8/2009 | Musgrove et al. |
| 2013/0268515 A1* | 10/2013 | Maslovskis ....... G06F 17/30991 707/722 |

* cited by examiner

*Primary Examiner* — Ethan D Civan
(74) *Attorney, Agent, or Firm* — Bryan Cave Leighton Paisner LLP

(57) ABSTRACT

A system, method and computer product for displaying product information is described herein. The system, for example, includes a memory device, a price bracketing module, and a price display module. The search engine module receives a product search request and search results data from the memory device associated with the product search request. The search results data include a plurality of product records. Each of the product records includes a price assigned with the associated product and an access number associated with the product. The access number being related to a number of times the product has been accessed by customers. The price bracketing module receives establishes a dynamic search result price range and a dynamic price multiple as a function of the search results data. The price display module responsively establishes a selectable list of price ranges associated with the product search request.

24 Claims, 11 Drawing Sheets

PRIOR ART

SYSTEM, METHOD, AND NON-TRANSITORY COMPUTER-READABLE STORAGE MEDIA FOR DISPLAYING PRODUCT INFORMATION ON WEBSITES

FIELD OF THE DISCLOSURE

The present invention relates to providing product information to a consumer, and more particularly, to systems, methods, and computer-readable storage media that generates and displays product information, including faceted price ranges, via a website in response to a consumer's product search request.

BACKGROUND

Many consumers desire to order items or goods remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria.

For example, a known online website that allows customers to purchase goods may use fixed price ranges in multiples of $10, e.g., $0-$10, $10-$20, $20-$30, . . . , $90-$100. However, if the price(s) associated with the products in the customer's search results cost above $100, the dynamic price ranges displayed will not contain any products and all related information will be irrelevant.

In addition, known search engines may sort the selected products based on product price as price is generally the most important factor in a customer's purchase. These search engines generally provide fixed faceted price ranges. For instance, in response to a product search, known online websites/search engines may provide a number of price ranges and provide information with respect to the search results that fall within the fixed price ranges. The price range are generally fixed across all searches/products. In other words, the fixed price ranges are preconfigured and are the same across all queries/searches. As such, since the price(s) for different products/searches may vary wildly, the fixed priced ranges provide a lot of information that may not include any product within a game price range. This information is irrelevant to the customer's search. Additionally, the display of the price range(s) with irrelevant information takes up valuable display space on the website or application, resulting in a cluttered and confusing appearance.

The present invention is aimed at one or more of the problems identified above.

SUMMARY OF THE INVENTION

In different embodiments of the present invention, systems, methods, and computer-readable storage media allow users to display relevant product information to a consumer via a website.

In one embodiment of the present invention, a system for displaying product information is provided. The system includes a memory device, a search engine module, a price bracketing module and a price display module. The memory device is configured to store product data associated with a plurality of products. The product data includes pricing information and access information related to the plurality of products. The search engine module is coupled to the memory device and is configured to receive a product search request and receive, from the memory device, search results data associated with the product search request. The search results data include a plurality of product records. Each of the product records includes a price assigned with the associated product and an access number associated with the product. The access number is related to a number of times the product has been accessed by a plurality of customers. The price bracketing module is coupled to the search engine module and is configured to receive the search results data from the search engine module and to responsively establish a dynamic search result price range and a dynamic price multiple as a function of the search results data. The price display module is coupled to the search engine module and the price bracketing module to receive the search results data, the dynamic search result price range, and the dynamic price multiple and to responsively establish a selectable list of price ranges associated with the product search request.

In another embodiment of the present invention, a method for displaying product information is provided. In a first step, product data associated with a plurality of products is stored in a memory device. The product data includes pricing information and access information related to the plurality of products. In a second step, a product search request is received at a search engine module and search results data associated with the product search request are received from the memory device. The search results data includes a plurality of product records. Each of the product records includes a price assigned with the associated product and an access number associated with the product. The access number is related to a number of times the product has been accessed by a plurality of customers. In a third step, the search results data from the search engine module is received at a price bracketing module and a dynamic search result price range and a dynamic price multiple as a function of the search results data. In a fourth step, the search results data, the dynamic search result price range, and the dynamic price multiple are received at a price display establishing a selectable list of price ranges associated with the product search request.

In still another embodiment of the present invention, one or more non-transitory computer-readable storage media, having computer-executable instructions embodied thereon, wherein when executed by at least one processor, the computer-executable instructions cause the processor to operate as a memory unit, search engine module, a price bracketing module and a price display module, is provided. The memory device is configured to store product data associated with a plurality of products. The product data includes pricing information and access information related to the plurality of products. The search engine module is coupled to the memory device and is configured to receive a product search request and receive, from the memory device, search results data associated with the product search request. The search results data include a plurality of product records. Each of the product records includes a price assigned with the associated product and an access number associated with the product. The access number is related to a number of times the product has been accessed by a plurality of customers. The price bracketing module is coupled to the search engine module and is configured to receive the search results data from the search engine module and to responsively establish a dynamic search result price range and a dynamic price multiple as a function of the search results data. The price display module is coupled to the search engine module and the price bracketing module to receive the search results data, the dynamic search result price range, and the dynamic price multiple and to responsively establish a selectable list of price ranges associated with the product search request.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIG. 10A is a prior art selectable price range list;

FIG. 10B is a selectable price range list, according to an embodiment of the present invention;

Figure 1:
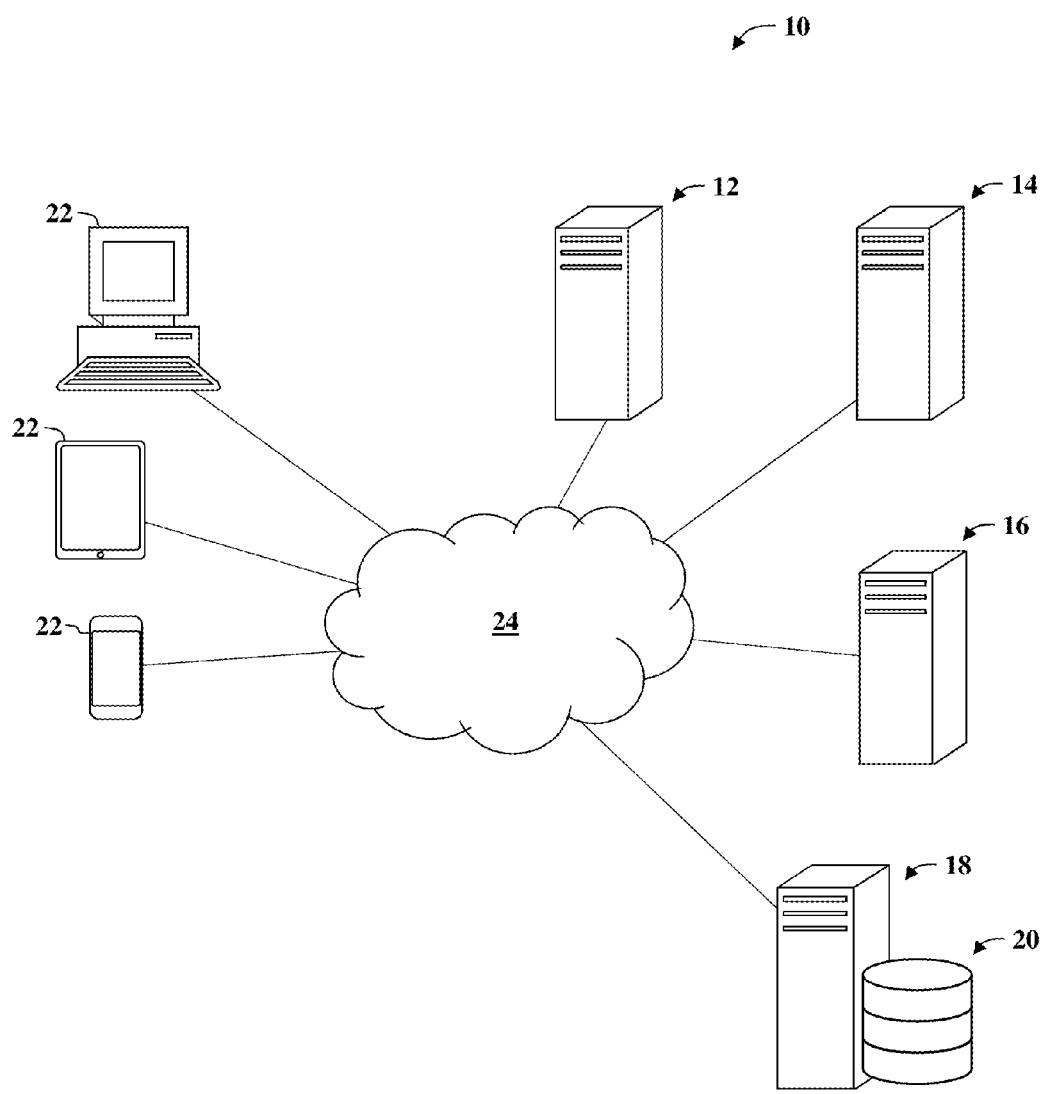
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes how product information may be displayed via a website to a consumer to increase the likelihood of the consumer purchasing one or more products being displayed and increase a conversion rate of the corresponding webpage. The conversion rate may be indicative of a rate at which a corresponding web page facilitates a user completing a predefined user activity such as, for example, viewing a predefined web page, ordering a product and/or service, and/or performing a predefined user task. Particularly, the present disclosure describes how a system provides a website to a consumer, receives a product search request from the consumer via a search webpage and generates and displays a ranked product list to the consumer in response to the request. The ranked product list is generated as a function of a plurality of categories associated with product records. The system generates a plurality of sorted groups based on the product record categories to generate the product list to display products that are relevant to the request of the consumer.

For example, in one embodiment, the system may generate search data including a plurality of product records associated with a search request received from a consumer with each of the product records including a plurality of record categories such as, for example, a product category, a product price, and/or a relevance score. The system may analyze the search data and generate a plurality of sorted groups and/or data buckets as a function of the frequency at which each product category appears in the search data. For example, the system may generate one or more first sorted groups including product records having associated product categories that appear most frequently in the search data. The system may also select a relevance score and generate a second sorted group as a function of the selected relevance score. For example, the system may generate the second sorted group including product records included in the first sorted group and having a relevance score that is greater than, or equal to, the selected relevance score. The system may also generate the ranked product list including the data records included in the second sorted group and ranked based on the corresponding product prices.

With reference to the FIGS. and in operation, the present invention provides a system 10, methods and computer product media that facilitates displaying product information to a user via a website. Referring to FIG. 1, an exemplary environment in which the system 10 operates is illustrated. In the illustrated embodiment, the system 10 is configured to enable a user to access a website with one or more user computing devices to view information indicative of products that may be purchase by the user via the website. In general, the system 10 generates and displays product lists in response to receiving a product search request from a consumer via a website. The system 10 generates search data including a plurality of product records as a function of the search request, and analyses the search data and generates sorted groups of product records based on one or more data categories included in the product records. The system 10 generates and displays faceted price range information of the search results to provide additional information that is relevant to the consumer's search request.

In one aspect of the present invention, the faceted price range information is dynamic and dependent upon the search results in order to provide the most relevant information to the customer in order to more efficiently convert the search into a purchase.

By providing dynamic faceted price information, the system transforms the search data into relevant product information and generates and displays product listings that are more relevant to the needs of the consumer over known search engines and that increase the likelihood of a consumer purchasing a product displayed in the list, thus increasing the overall revenue being generated by the website.

In addition, by generating the dynamic faceted price ranges, the system 10 improves the speed and functionality of known computing systems by reducing the amount of irrelevant information being displayed in response to a user's search request, thus reducing the computing resources required to generate and display relevant search results.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 12, a search engine server 14, a sorting server 16, a database server 18, a database 20, and one or more user computing devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, customer account information, product records, data categories, category values, sorted data groups, and/or any suitable information that enables the system 10 to function as described herein.

Figure 4:
FIG. 4 is an illustration of an exemplary screenshot from the system of FIG. 1, according to an embodiment of the present invention.
Figure 5:
FIG. 5 is an illustration of an exemplary screenshot from the system of FIG. 1, according to an embodiment of the present invention.

The website hosting server 12 is configured to host a website 26 that is accessible by a user via one or more user computing devices 22. The website hosting server 12 retrieves and stores web pages 28 (shown in FIGS. 4 and 5) associated with one or more websites 26 in response to requests received by the user via the user computing device 22 to allow users to interact with the website and search and/or purchase products such as, for example, goods and/or services via the website. In one embodiment, the website hosting server 12 is configured to generate and display web pages 28 associated with the website in response to requests being received from consumers via corresponding web browsers that are displayed on the user computing devices 22. For example, in one embodiment, the website hosting server 12 may display a product search webpage 30 (shown in FIG. 4) in response to receiving a user request that allows a user to input a product search request including search criteria including one or more search terms. In addition, the website hosting server 12 may transmit the product search request to the search engine server 14 and/or the sorting server 16 for use in generating search data and/or product lists in response to the user's search request. The website hosting server 12 may also receive one or more product lists 32 (shown in FIG. 5) from the search engine server 14 and/or the sorting server 16 that includes information associated with products that are selected based on the user's search criteria. The website hosting server 12 may also display a search results webpage 34 to display the product lists 32 to the user and to allow the user to select one or more of the displayed products for purchase.

In the illustrated embodiment, the search engine server 14 is configured to receive a product search request from the website hosting server 12 including one or more search terms, and generate search data including a plurality of product records as a function of the search terms. For example, in one embodiment, the search engine server 14 may initiate a search algorithm based on a Boolean model to search product records contained in the database 20 based search terms received from the user. One system that provides a suitable system 10, including a search engine server 14 is disclosed in U.S. patent application Ser. No. 14/633,022, filed on Feb. 26, 2015 which is disclosed herein by reference.

Figure 2:
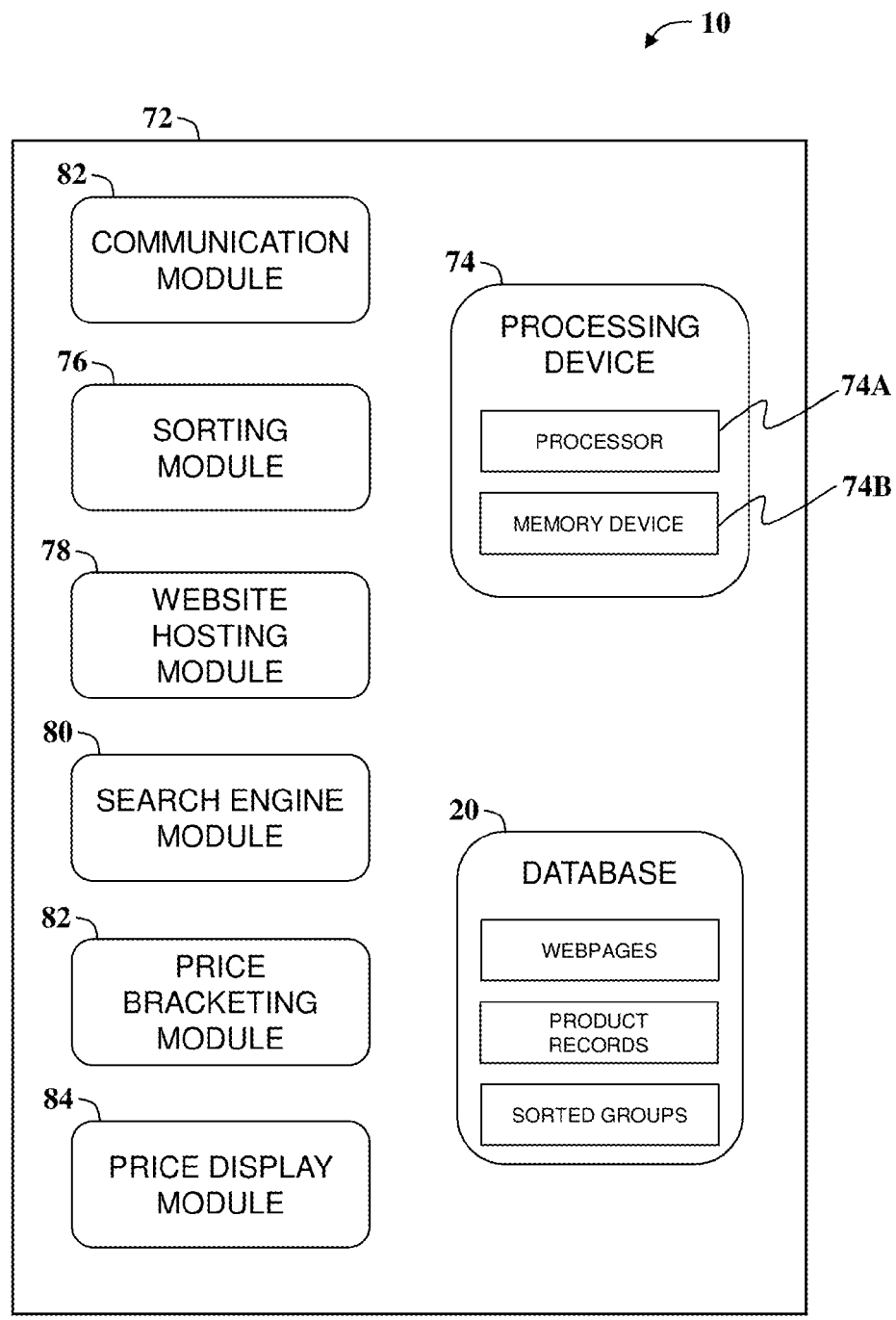
FIG. 2 is a schematic illustrating example components of a server, according to an embodiment of the present invention.

Referring to FIG. 2, in one embodiment, the system 10 may include a system server 72 that is configured to perform the functions of the website hosting server 12, the search engine server 14, the sorting server 16, and the database server 18. In the illustrated embodiment, the system server 72 includes a processing device 74 and the database 20.

The processing device 74 executes various programs, and thereby controls components of the system server 72 according to user instructions received from the user computing device 22. The processing device 74 may include a processor or processors 74A and a memory device 74B, e.g., read only memory (ROM) and random access memory (RAM), storing processor-executable instructions and one or more processors that execute the processor-executable instructions. In embodiments where the processing device 74 includes two or more processors 74A, the processors 74A can operate in a parallel or distributed manner. In an example, the processing device 74 may execute a sorting module 76, a website hosting module 78, and a search engine module 80, a communications module 82, a price bracketing module 84, and a price display module 86.

The memory device 74B may be configured to store programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications module 82 retrieves various data and information from the database 20 and sends information to the user computing device 22 via the communications network 24 to enable the user to access and interact with the system 10. In one embodiment, the communications module 82 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The website hosting module 78 may be programmed to perform some or all of the functions of the website hosting server 12 including hosting various web pages associated with one or more websites that are stored in the database 20 and that are accessible to the user via the user computing device 22. The website hosting module 78 may be programmed to generate and display web pages associated with a website in response to requests being received from users via corresponding web browsers.

The search engine module 80 may be programmed to perform some or all of the functions of the search engine server 14 including generating and storing search data 36 in response to the user's product search request. In addition, the search engine module 80 may also be programmed to generate a relevance score associated with each of the product records 38 included in the search data 36.

The sorting module 76 may be programmed to perform some or all of the functions of the sorting server 16 including selecting a first sorting value and generating a first sorted group of product records as a function of the first sorting value, and selecting a second sorting value and generating a second sorted group as a function of the product records included in the first sorted group and the second sorting value. In addition, the sorting module 76 may also be programmed to generate a product list as a function of the second sorted group and display the product list on a website in response to the product search request.

As discussed above, the memory device 74B is configured to store product data associated with a plurality of products. The product data may include pricing information and access information related to the plurality of products. In general, the access information provides information related to expressed customer interest in a product. For example, the access information may include, but is not limited to, (the number of) prior purchases by customers of the product, inclusion of the product in prior search results by customers, "clicks" or "click-throughs") by customers, i.e., selection of a hyper-link in the search results to access additional information about the product, and/or any combination thereof.

As discussed above, the search engine module 80 is coupled to the memory device 74B and is configured to receive a product search request and receive, from the memory device 74B, search results data associated with the product search request. The search results data will generally include a plurality of product records. Each of the product records includes a price assigned with the associated product and an access number associated with the product. The access number is related to a number of times the product has been accessed by a plurality of customers.

The price bracketing module 82 is coupled to the search engine module 80 and configured to receive the search results data from the search engine module 80 and to responsively establish a dynamic search result price range and a dynamic price multiple as a function of the search results data. In general, the dynamic search price result price range would be established to include all or most of the products in the search results. In a more specific embodiment, the dynamic price result price range would be established to include a predetermined percentage, M, of the products in the search results. In one embodiment, the predetermined percentage is 90%.

For instance, if a particular search yielded results containing 50 products and the access number for all 50 products was 10,000, then in one embodiment, the dynamic range would be established to include M of the products of either the number of different products (50) or the access number (10,000). Further, in one example, if M was equal to 90% and the 90% of the search results (based on price) were in the range of $50 to $500, then the dynamic price range [X,Y] would be [$50, $500].

In another aspect of the present invention, the price bracketing module 82 also establishes a dynamic price multiple as a function of the dynamic price range. For instance, if the dynamic price range is in the range of $100-$1,000, then the dynamic price multiple may be set to $25 or if the dynamic price range is in the range of $0-$50, then the dynamic price multiple may be set to $10.

In another embodiment, the dynamic price multiple is not constant. In this embodiment, the dynamic price range is broken up into segments based on access number. For example, the dynamic price multiple may be a number of the access numbers. In other words, each segment may be established to include the same (or generally the same) number of access number, e.g., products.

In another aspect of the present invention, the dynamic price multiple is established to define a predetermined number of price multiples within the dynamic search result price range. For example, the dynamic price multiple may be established by dividing the price range by a predetermined dynamic price range (Y-X) by a predetermined constant, e.g., N. The quotient may then be rounded up or estimated up to the nearest whole number.

The price display module 84 is coupled to the search engine module 80 and the price bracketing module 82 to receive the search results data, the dynamic search result price range, and the dynamic price multiple and responsively establish a selectable list of price ranges associated with the product search request.

Figure 6:
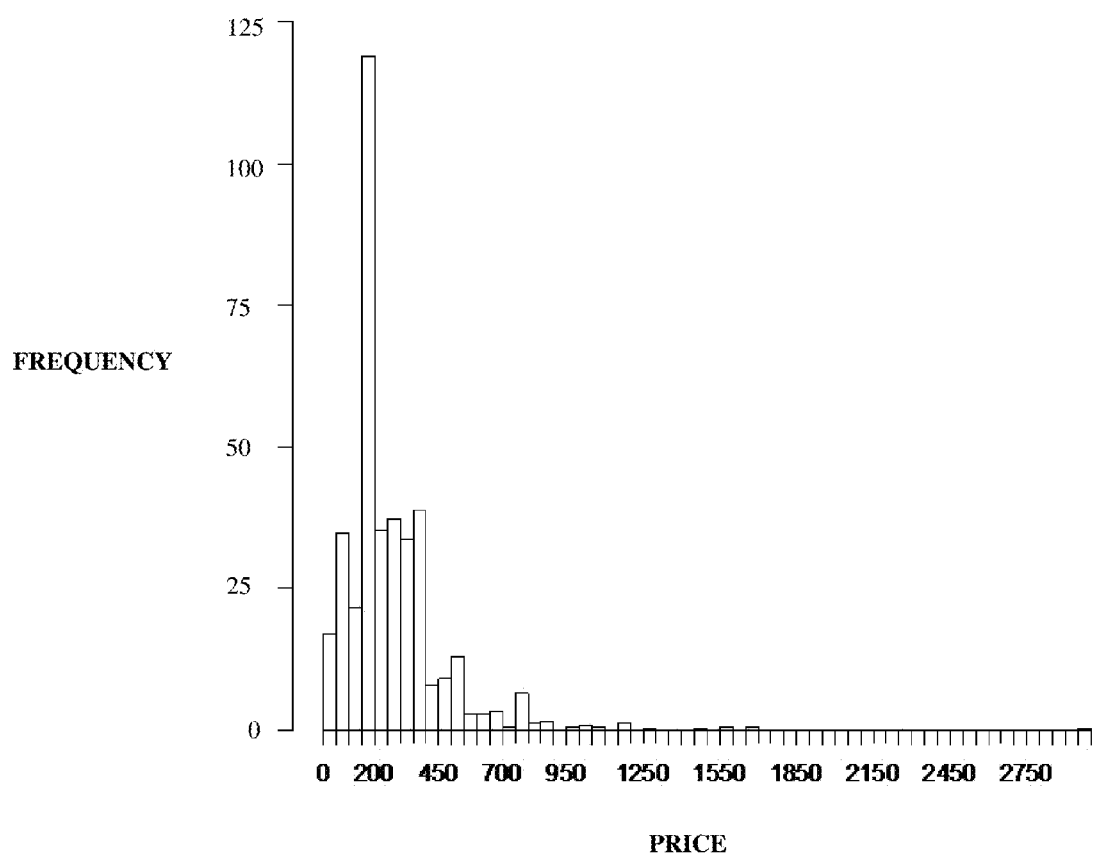
FIG. 6 is a graph of frequency versus price for an exemplary search.
Figures 9A, 9B:
FIG. 9A is a prior art selectable price range list.
FIG. 9B is a selectable price range list, according to an embodiment of the present invention.

With reference to FIG. 6 a graph of access number, i.e., frequency versus price for a hypothetical search or query is shown. As shown, in the hypothetical example, most of the products in the search result have a price between $100 and $700. In the prior art, the search result would include a selectable list of price ranges that are fixed are used for all searches. For example, an exemplary prior art list of price ranges is shown in FIG. 9A. In this example, the list of price ranges are: 0-$10; $10-$20; $20-$50; $50-$100; $100-$150; $150-$200; and $200-$250. Each entry may be selectable. If the customer selects one of the entries, then the products within the range are displayed. Alternatively, or in addition, each entry may have a checkbox entry. The customer may select one or more of the checkboxes. The products within each selected range are displayed.

The selectable list is displayed with the search results. Since most of the orders are between $100 and $700, the ranges 0-$10; $10-$20; $20-$50; and $50-$100 are not relevant to the customer for this particular search. Thus, a lot of display space is wasted.

An exemplary selectable list according to an embodiment of the present invention is shown in FIG. 9B. In this embodiment, the following ranges are used: $0-$150; $150-$200; $200-$250; $250-$300; $300-$350; $350-$450; $450-$700; and $700+.

As discussed above, the ranges may be established such that each interval has the same or generally the same number of products.

Figure 7:
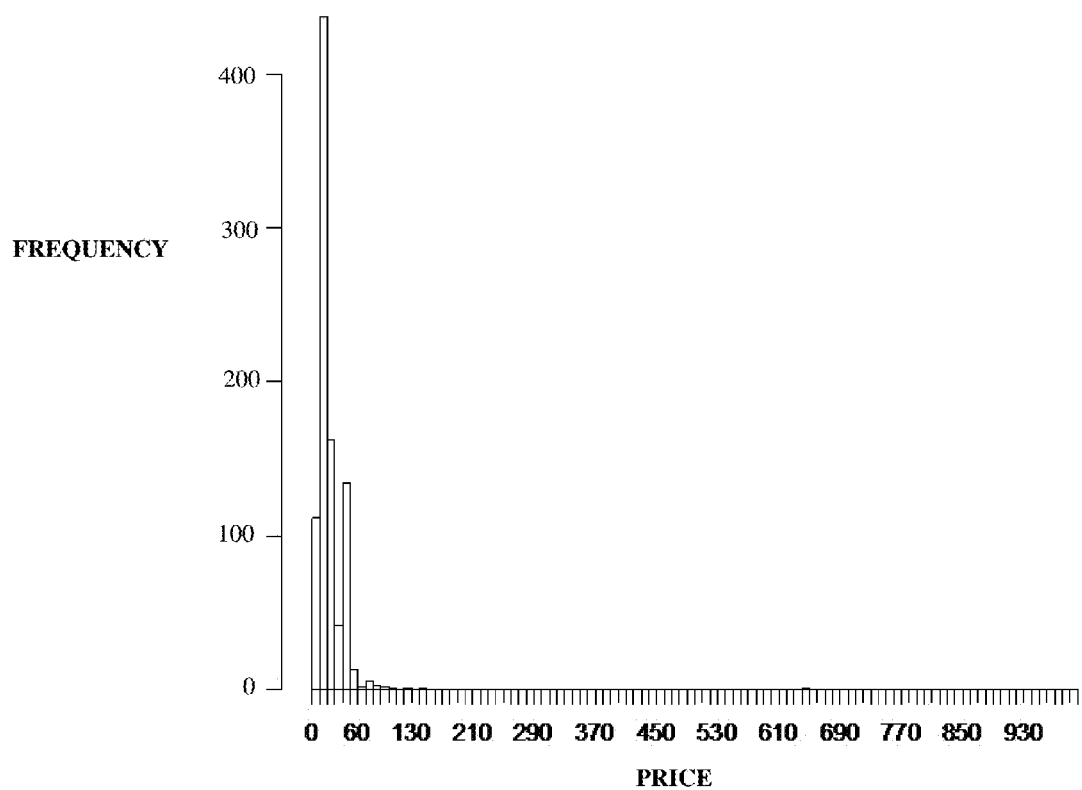
FIG. 7 is a graph of frequency versus price for a second exemplary search.
Figures 10A, 10B:
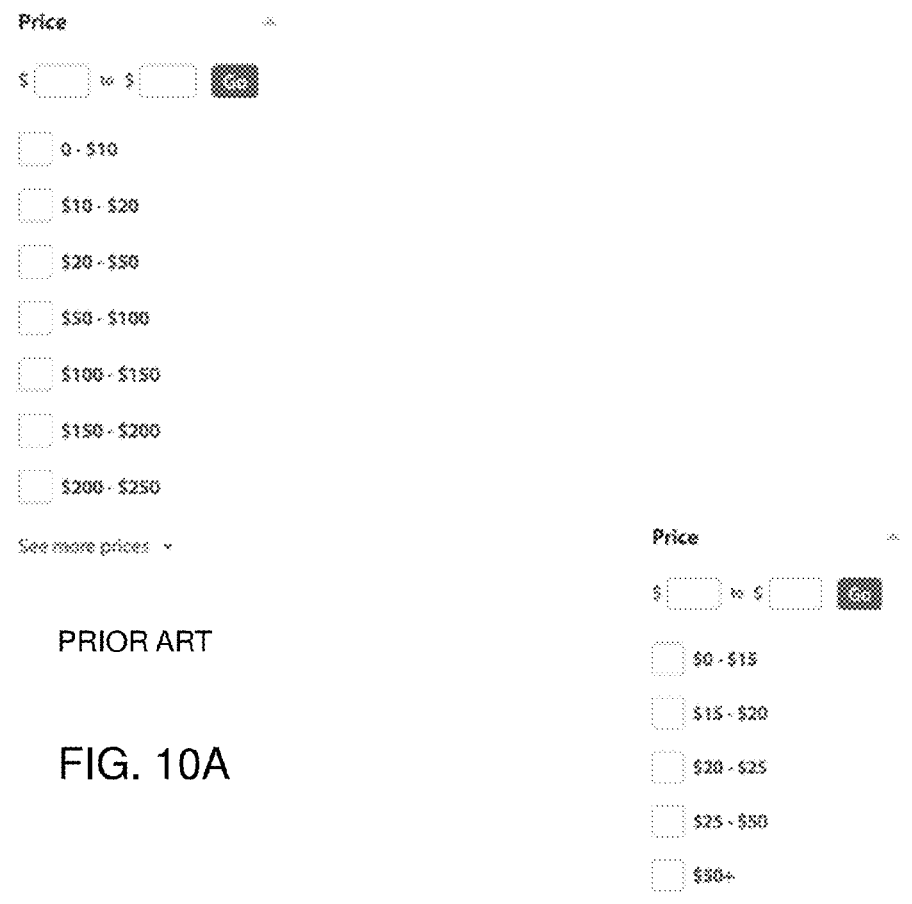

Another hypothetical example is shown in FIGS. 7, 10A, and 10B. In the graph of FIG. 7, most of the orders/products are within $0 and $100. The standard or prior art list is shown in FIG. 10A. Since most of the orders are between $0 and $100, the last four entries ($100-$150; $150-$200; and $200-$250) are irrelevant to the search request and this represent wasted display space.

An exemplary selectable list according to an embodiment of the present invention is shown in FIG. 10B. In this embodiment, the following ranges are used: $0-$15; $15-$20; $20-$25; $25-$50; and $50+.

Figure 8:
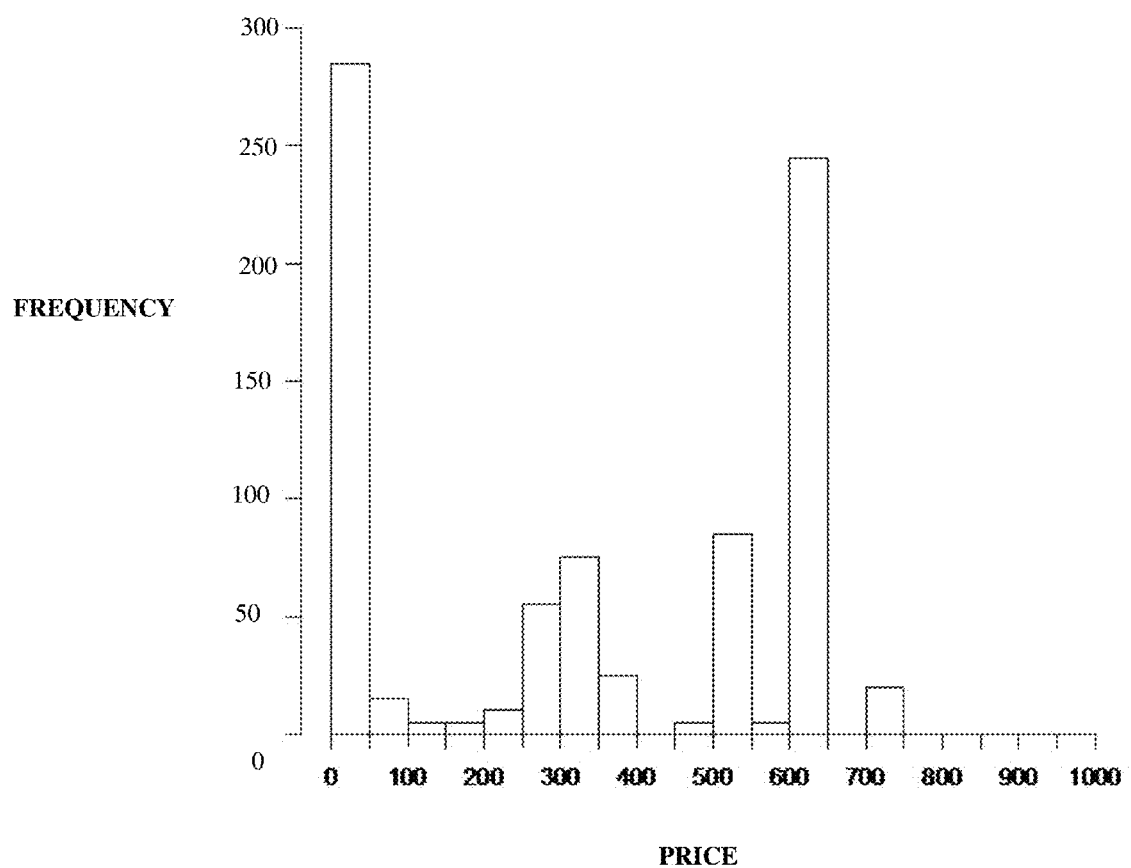
FIG. 8 is a graph of frequency versus price for a third exemplary search.
Figures 11A, 11B:
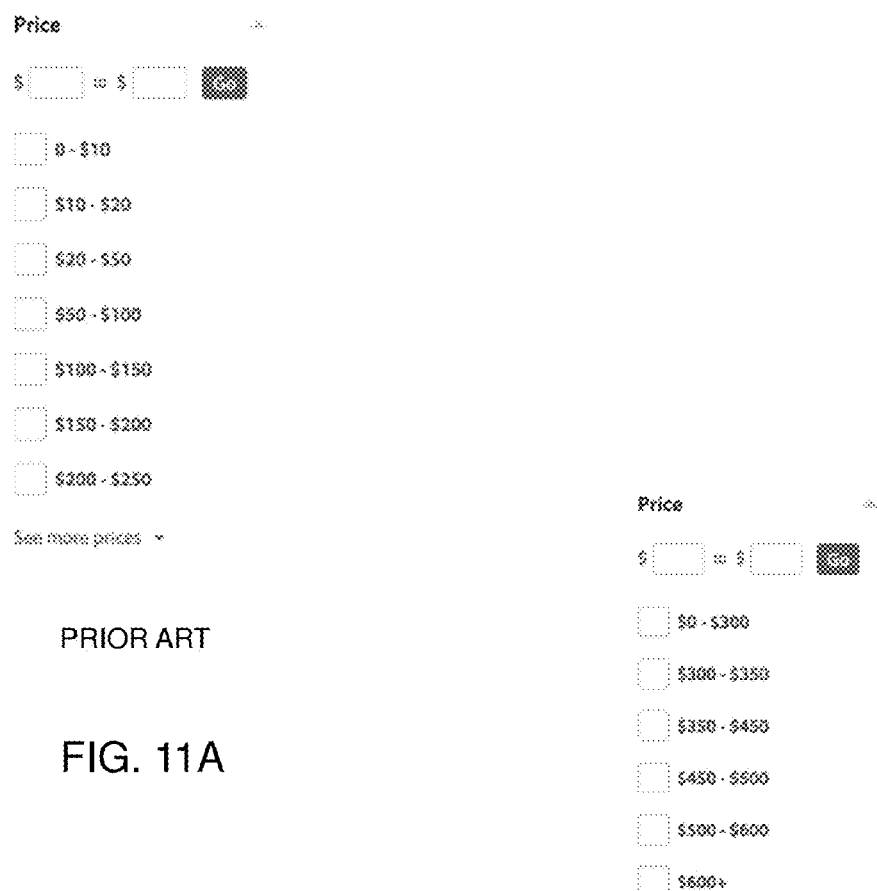
FIG. 11A is a prior art selectable price range list.
FIG. 11B is a selectable price range list, according to an embodiment of the present invention.

Another hypothetical example is shown in FIGS. 8, 11A, and 11B. The graph of FIG. 8 represents a bimodal price distribution. A multimodal price distribution could be caused by a couple factors. For instance, the customer's search request could result in more than one type of product being included. Or, there could be more than one price point, e.g., economy or deluxe models, for a particular product. In this example, most of the orders are in the $0-10 range or in the $200-$650 range. Based on this data, two different price ranges could be established. Each price range may have its own price range multiple. As in the above example, the price range multiple may either be an interval of prices or an interval containing the same or generally same number of products. The prior art list of prices is shown in FIG. 11A. In this example, the following entries are irrelevant: $10-$20; $10-$20; $20-$50; $50-$100; $100-$150; and $150-$200. Furthermore, the customer would have to expand the list to see any range above $200.

An exemplary selectable list according to an embodiment of the present invention is shown in FIG. 10B. In this embodiment, the following ranges are used: $0-$300; $300-350; $350-$450; $450-$500; $500-$600; and $600+.

In one embodiment of the present invention, the memory device may include one or more of the memory devices and/or mass storage devices of one or more of the computing devices or servers. The modules that comprise the invention are composed of a combination of hardware and software, i.e., the hardware as modified by the applicable software applications. In one embodiment, the units of the present invention are comprised of one of more of the components of one or more of the computing devices or servers, as modified by one or more software applications.

Figure 3:
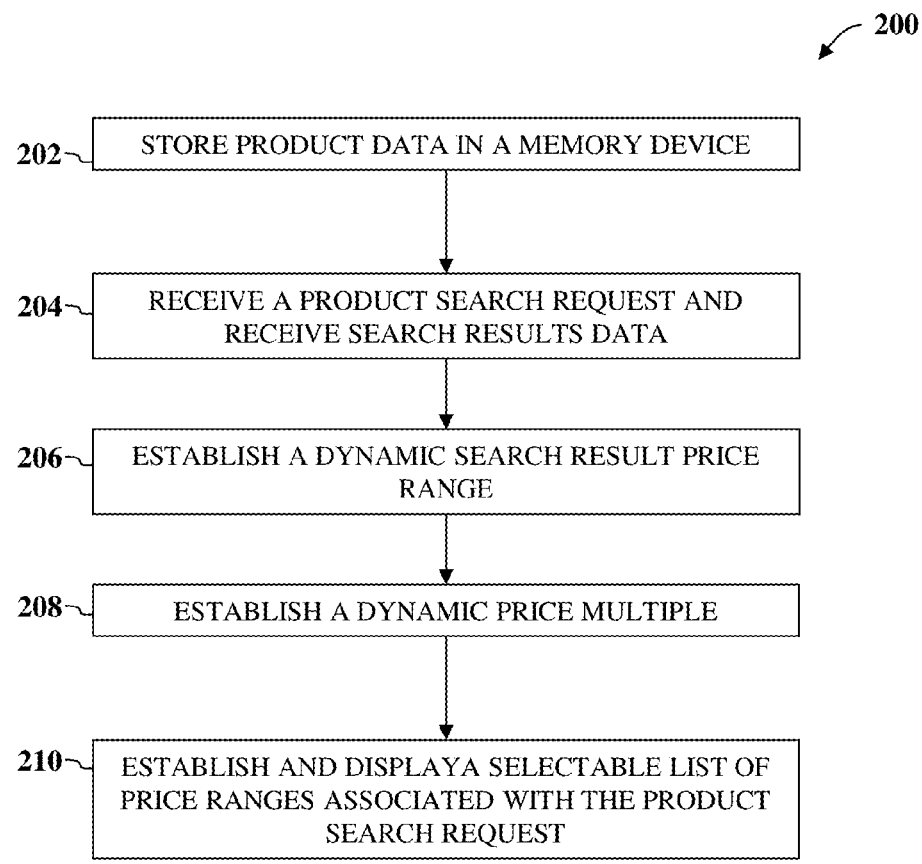
FIG. 3 is a flowchart of a method that may be used with the system shown in FIG. 1, according to an embodiment of the present invention.

FIG. 3 is a flowchart of method 200 that may be used with the system 10 for displaying product information on a website. The method includes a plurality of steps. Each method step may be performed independently of, or in combination with, other method steps. Portions of the method may be performed by any one of, or any combination of, the components of the system 10.

In a first step 202, product data associated with a plurality of products is stored in a memory device 74B. The product data may include pricing information and access information related to the plurality of products. In a second step 204, a product search request is received at a search engine module 80. Search results are received at the search engine module 80 from the memory device 74B. The search results data may include a plurality of product records. Each of the product records may include a price associated with the associated product and an access number associated with the product. The access number is related to a number of times the product has been accessed by a plurality of customers (see above).

In a third step 206, a dynamic search result price range is established as a function of the search results data. In a fourth step 208, a dynamic price multiple is established.

In a fifth step 210, a selected list of price ranges associated with the product search request is established and displayed.

INDUSTRIAL APPLICABILITY

The present invention is aimed at systems and method that generates price facet with ranges optimized for the query/category. Fine-grained price breaks assist customers find the products in their expected ranges more quickly, and also reduce the amount of display space needed to display the price information.

In one embodiment of the present invention, the general aim of the system is to:
- Always maintain intuitive price ranges (multiples of $50 if in the range 100-1000), multiples of $25 if we are in the range 0-$100, multiples of $10 if we are in the range 0-$50.
- Calculate the range of prices that covers 90% of orders, say it is [x,y] rounded to the nearest multiple of $50 or $100. Thus, the end point ranges as 0-$x, and $y+.
- Make intuitive breaks within $x-$y.
- Intuitive breaks or intervals may be based on product sakes, item clicks and/or item counts to compute the price distribution.

In one aspect of the present invention, one approach is to view the dynamic price facet generation problem, as a dual of source coding with side information problem for humans. In standard information theoretic context, source coding with side information problems studies how much a source signal can be compressed in such a way that it can be perfectly recovered by a party which has some side information about the source. Here, one goal is to 'shape' the side information, i.e., the smart price facet, in a form that provides as much relevant information about the item that an average customer is expected to purchase as possible, while at the same time, remain in a form that can be easily digestible by users.

To that end, for any query and user segment, search results may be associated with a random variable (X), whose probability distribution captures the likelihood of purchase for the given user segment. The goal of the product search engine is to communicate X to the user by using the least amount of resources as possible. The smart price facet (call it Y), is designed such that, it gives as much information about X as possible, i.e., the mutual information $I(X;Y)$ should be as large as possible. To ensure this, the facet values are chosen such that the random variable Y is uniformly distributed; i.e., number of orders in each price range is identical.

However, such price ranges may provide unnatural breaks, which cannot be easily digestible by users. For instance, a price range $9.12-$19.44 is more difficult to read compared to $10-$20. This issue may be addressed by posing this as an optimization problem, where the goal is to choose the best intuitive break points that deviates the least from the optimal breaks (i.e., minimizes the L−1 error). In one embodiment, one approach solves this optimization problem, by choosing the closest intuitive ranges for each facet value, e.g., modify $9.12-$19.44 to $10-$20.

Finally, the present invention may provide skewed results where the product price distribution is skewed towards less expensive items, e.g., for query 'phone', which includes many cheap accessories and some expensive smartphones. Depending on the context, it may be better to use the revenue distribution of items to represent X, rather than order distribution.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for displaying product information, comprising:
    one or more computer processors; and
    one or more non-transitory memory storage systems storing computing instructions configured to run on the one or more computer processors, the one or more non-transitory memory storage systems comprising:
        a memory device configured to store product data associated with a plurality of products, the product data including pricing information and access information related to the plurality of products;
        a search engine module coupled to the memory device and configured to receive a product search request from a graphical user interface of a computing device of a user, the memory device configured to receive search results data associated with the product search request, the search results data including a plurality of product records, each product record of the plurality of product records including a price assigned with an associated product and an access number associated with the associated product, the access number being related to a number of times the associated product has been accessed by a plurality of customers;
        a price bracketing module coupled to the search engine module configured to receive the search results data from the search engine module, the price bracketing module configured to determine a dynamic search result price range and a dynamic price multiple as a function of the search results data, the price bracketing module configured to filter the search results data, wherein:
            a first group of the search results data comprises product records with access numbers greater than a pre-determined threshold number;
            a second group of the search results data comprises product records with product categories with relevance scores greater than a pre-determined threshold relevance score; and
            a faceted price range comprising a combination of the first group and the second group of the search results data that is (a) ranked by price for each product record of the plurality of product records and (b) sorted in a respective faceted price range based on the dynamic price multiple applied to the faceted price range; and
        a price display module coupled to the search engine module and the price bracketing module, and configured to display the faceted price range on the graphical user interface of the computing device of the user, wherein the faceted price range is associated with the product search request of the user.

2. A system in accordance with claim 1, wherein the dynamic price multiple is established as a function of the dynamic search result price range.

3. A system in accordance with claim 2, wherein the dynamic price multiple is established to define a predetermined number of price multiples within the dynamic search result price range.

4. A system in accordance with claim 1, wherein the dynamic search results price range is established to include a predetermined percentage of the access numbers.

5. A system in accordance with claim 4, wherein the predetermined percentage is 90%.

6. A system in accordance with claim 1, wherein the access number is a function of at least one of a number of purchases, a number of clicks, or a number of counts associated with products within the search results data.

7. A system in accordance with claim 1, wherein the price bracketing module is further configured to responsively establish a second dynamic search result price range and a second dynamic price multiple as a function of the search results data.

8. A system in accordance with claim 1, wherein the price bracketing module is configured to establish the dynamic price multiple such that a number of the access numbers within each dynamic price multiple is generally the same.

9. A method for displaying product information, comprising:
    storing, with a computer system using one or more processors, product data associated with a plurality of products in a memory device, the product data including pricing information and access information related to the plurality of products;
    receiving, with the computer system at a search engine module, a product search request from a graphical user interface of a computing device of a user;
    receiving, with the computer system from the memory device, search results data associated with the product search request, the search results data including a plurality of product records, each product record of the plurality of product records including a price assigned with an associated product and an access number associated with the associated product, the access number being related to a number of times the associated product has been accessed by a plurality of customers;
    receiving, with the computer system at a price bracketing module coupled to the search engine module, the search results data from the search engine module;
    determining, with the computer system at the price bracketing module, a dynamic search result price range and a dynamic price multiple as a function of the search results data;

filtering, with the computer system, the search results data, wherein:
a first group of the search results data comprises product records with access numbers greater than a pre-determined threshold number;
a second group of the search results data comprises product records with product categories with relevance scores greater than a pre-determined threshold relevance score; and
a faceted price range comprising a combination of the first group and the second group of the search results data that is (a) ranked by price for each product record of the plurality of product records and (b) sorted in a respective faceted price range based on the dynamic price multiple applied to the faceted price range; and
displaying, with the computer system at a price display module coupled to the search engine module, the faceted price range on the graphical user interface of the computing device of the user, wherein the faceted price range is associated with the product search request of the user.

10. A method in accordance with claim 9, wherein the dynamic price multiple is established as a function of the dynamic search result price range.

11. A method in accordance with claim 10, wherein the dynamic price multiple is established to define a predetermined number of price multiples within the dynamic search result price range.

12. A method in accordance with claim 9, wherein the dynamic search results price range is established to include a predetermined percentage of the access numbers.

13. A method in accordance with claim 12, wherein the predetermined percentage is 90%.

14. A method in accordance with claim 9, wherein the access number is a function of at least one of a number of purchases, a number of clicks or a number of counts associated with products within the search results data.

15. A method in accordance with claim 9, further comprising responsively establishing a second dynamic search result price range and a second dynamic price multiple as a function of the search results data.

16. A method in accordance with claim 9, further comprising establishing the dynamic price multiple such that a quantity of the access numbers within each dynamic price multiple is generally the same.

17. One or more non-transitory computer-readable storage media, having computer-executable instructions embodied thereon and configured to run on at least one processor, the one or more non-transitory computer-readable storage media comprising:
a memory device configured to store product data associated with a plurality of products, the product data including pricing information and access information related to the plurality of products;
a search engine module coupled to the memory device and configured to receive a product search request from a graphical user interface of a computing device of a user, the memory device configured to receive search results data associated with the product search request, the search results data including a plurality of product records, each product record of the plurality of product records including a price assigned with an associated product and an access number associated with the associated product, the access number being related to a number of times the associated product has been accessed by a plurality of customers;
a price bracketing module coupled to the search engine module configured to receive the search results data from the search engine module, the price bracketing module configured to determine a dynamic search result price range and a dynamic price multiple as a function of the search results data, the price bracketing module configured to filter the search results data, wherein:
a first group of search results data comprises product records with access numbers greater than a pre-determined threshold number;
a second group of search results data comprises product records with product categories with relevance scores greater than a pre-determined threshold relevance score; and
a faceted price range comprising a combination of the first group and the second group of search results data that is (a) ranked by price for each product record of the plurality of product records and (b) sorted in a respective faceted price range based on the dynamic price multiple applied to the faceted price range; and
a price display module coupled to the search engine module and the price bracketing module, configured to display the faceted price range on the graphical user interface of the computing device of the user, wherein the faceted price range is associated with the product search request of the user.

18. The one or more non-transitory computer-readable storage media of claim 17, wherein the dynamic price multiple is established as a function of the dynamic search result price range.

19. The one or more non-transitory computer-readable storage media of claim 18, wherein the dynamic price multiple is established to define a predetermined number of price multiples within the dynamic search result price range.

20. The one or more non-transitory computer-readable storage media of claim 17, wherein the dynamic search results price range is established to include a predetermined percentage of the access numbers.

21. The one or more non-transitory computer-readable storage media of claim 20, wherein the predetermined percentage is 90%.

22. The one or more non-transitory computer-readable storage media of claim 17, wherein the access number is a function of at least one of a number of purchases, a number of clicks and a number of counts associated with products within the search results data.

23. The one or more non-transitory computer-readable storage media of claim 17, wherein the price bracketing module is further configured to responsively establish a second dynamic search result price range and a second dynamic price multiple as a function of the search results data.

24. The one or more non-transitory computer-readable storage media of claim 17, wherein the price bracketing module is configured to establish the dynamic price multiple such that a number of the access numbers within each dynamic price multiple is generally the same.

* * * * *